United States Patent [19]

Hayakawa et al.

[11] 3,805,169

[45] Apr. 16, 1974

[54] CIRCUIT FOR CONFIRMING POSITIONING OPERATION

[75] Inventors: Kyohei Hayakawa; Hiroshi Maeda, both of Nagoya City; Noritada Habara, Nishi-Kasugai-gun, all of Japan

[73] Assignee: Mitsubishi Jukogyo Kabushiki Kaisha, Tokyo, Japan

[22] Filed: Mar. 20, 1972

[21] Appl. No.: 236,371

[52] U.S. Cl............... 328/71, 235/151.11, 328/94, 328/112, 328/117, 328/147, 328/149
[51] Int. Cl...................... H03k 5/153, H03k 19/24
[58] Field of Search .......... 307/204, 218, 219, 234, 307/235, 243, 94; 328/61, 71, 73, 110, 117, 116, 137, 111, 112, 147, 148, 149, 154; 235/151.11, 151.3, 151.32

[56] References Cited
UNITED STATES PATENTS

| | | | |
|---|---|---|---|
| 3,122,729 | 2/1964 | Bothwell et al.................. | 328/148 X |
| 3,127,589 | 3/1964 | Harris.............................. | 328/148 X |
| 3,539,896 | 11/1970 | Reuteler et al. ................. | 328/137 X |
| 3,593,285 | 7/1971 | Gillmann...................... | 307/235 R X |
| 3,666,930 | 5/1972 | McDaniel ...................... | 328/154 X |
| 3,495,144 | 2/1970 | Elbling........................ | 235/151.11 X |

*Primary Examiner*—Rudolph V. Rolinec
*Assistant Examiner*—L. N. Anagnos
*Attorney, Agent, or Firm*—Toren and McGeady

[57] ABSTRACT

A circuit for confirming positioning operation comprising a plurality of comparator-amplifiers which compare instruction signals with present-position detection signals and provide the results as error signals, a plurality of primary comparators or a single primary comparator which compare or compares the plurality of error signals from the comparator-amplifiers or one of such detected signals having the maximum value with an upper-limit reference signal, a plurality of secondary comparators or a single secondary comparator which compare or compares the plurality of error signals from the comparator-amplifiers or one of such detected signals having the minimum value with a lower-limit reference signal, an AND circuit which ANDs the output signals from the primary and secondary comparators, and a pulse-width discriminating circuit which sends out a positioning-operation completion signal at the moment when the duration of the certain signal obtained from the AND circuit has become equal to a predetermined period of time.

5 Claims, 3 Drawing Figures

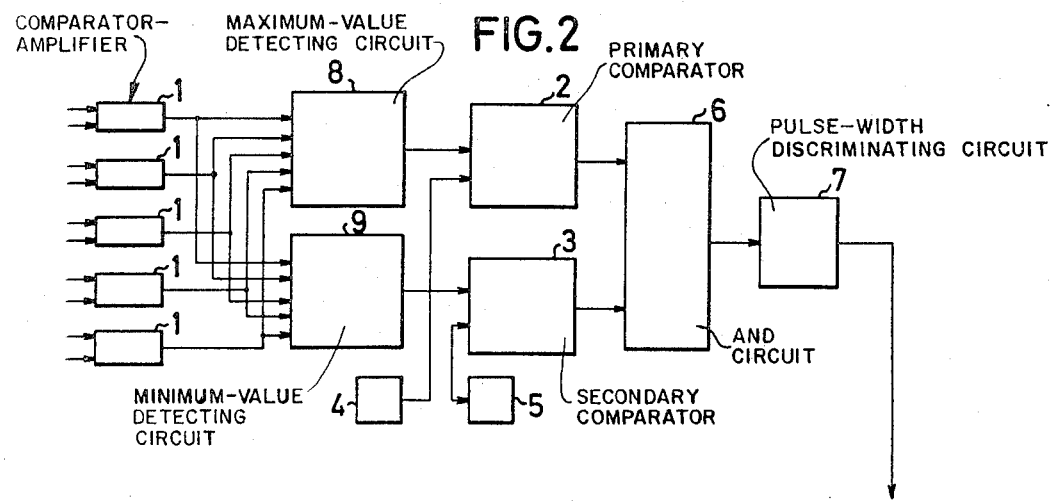
FIG.2
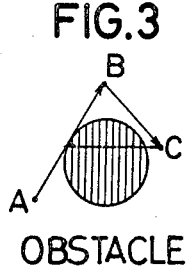
FIG.3 POSITIONING-OPERATION COMPLETION SIGNAL
OBSTACLE

CIRCUIT FOR CONFIRMING POSITIONING OPERATION

This invention relates to a circuit for confirming a positioning operation so as to provide subsequent operation signals after the immediately preceding operation has been actually completed as instructed, in order that all of the operations under program control of, for example, a robot for industrial use can be performed without fail.

In program control of industrial robots and the like, it has been a common practice for positioning to apply a designated voltage corresponding to the position to which the robot is to be moved and, after the lapse of a predetermined period of time as set in a timer, the next instruction is given to the robot.

In such a known system, however, there is no means of making certain whether a given operation has been actually performed and, even if the instruction for the operation has been neglected, the robot will proceed to the next operation simply after the lapse of the predetermined time. When this happens, the robot will not only fail to carry out the duties as such but may also have the danger of colliding with some obstacle or other on its path. By way of an example, it is assumed that in press forging with the aid of an industrial robot the program is so planned that the instruction for starting the pressing is given after a work has been placed on a die and the robot arm has receded. If, in this case, instruction is provided to start the press without making sure that the robot arm has retracted, then there will be the danger of the arm forging the arm together with the work. This in turn may lead to destruction of the die and even the arm itself. If these possibilities were to be precluded, it would appear advisable to mount limit switches in all of present positions as means to detect the arrival of the robot arm at specific target positions. However, too many positions which must be preset make this concept impracticable.

It is a fundamental object of this invention to provide a circuit for confirming positioning operation without the disadvantages of the conventional circuits. The confirmation circuit according to the invention comprises: a plurality of comparator-amplifiers which compare instruction signals with present-position detection signals and provide the results as error signals; a plurality of primary comparators or a single primary comparator which compare or compares the plurality of error signals from the comparator-amplifiers or one of such detected signals having the maximum value with an upper-limit reference signal; a plurality of secondary comparators or a single secondary comparator which compare or compares the plurality of error signals from the comparator-amplifiers or one of such detected signals having the minimum value with a lower-limit reference signal; an AND circuit which ANDs the output signals from the primary and secondary comparators; and a pulse-width discriminating circuit which sends out a positioning-operation completion signal at the moment when the duration of the certain signal obtained from the AND circuit has exceeded a predetermined time. With the construction above described, the positioning operation is reliably and safely performed because it is only after the arrival at the target position has been reached that the subsequent operational instruction is provided. Another advantage is that the circuit for generating such positioning-operation completion signals is incorporated in a program control unit, thus eliminating the necessity of limit switches which are usually mounted on the outside of the robot. Furthermore, the invention provides a positioning-operation confirmation circuit which prevents the generation of any positioning-operation completion signal before the arrival of the robot arm at the target position, as by overshooting, and produces such completion signal only after the positioning has been actually performed.

These and other objects and advantages of the present invention will be better understood from the following detailed description taken in conjunction with the accompanying drawings showing preferred embodiments thereof. In the drawings:

FIG. 2 is a block diagram explanatory of an embodiment of the invention for multiaxial control; and FIG. 3 is a diagrammatic representation of the positioning motion according to the invention in an application where there is an obstacle in the path.

Figure 1:
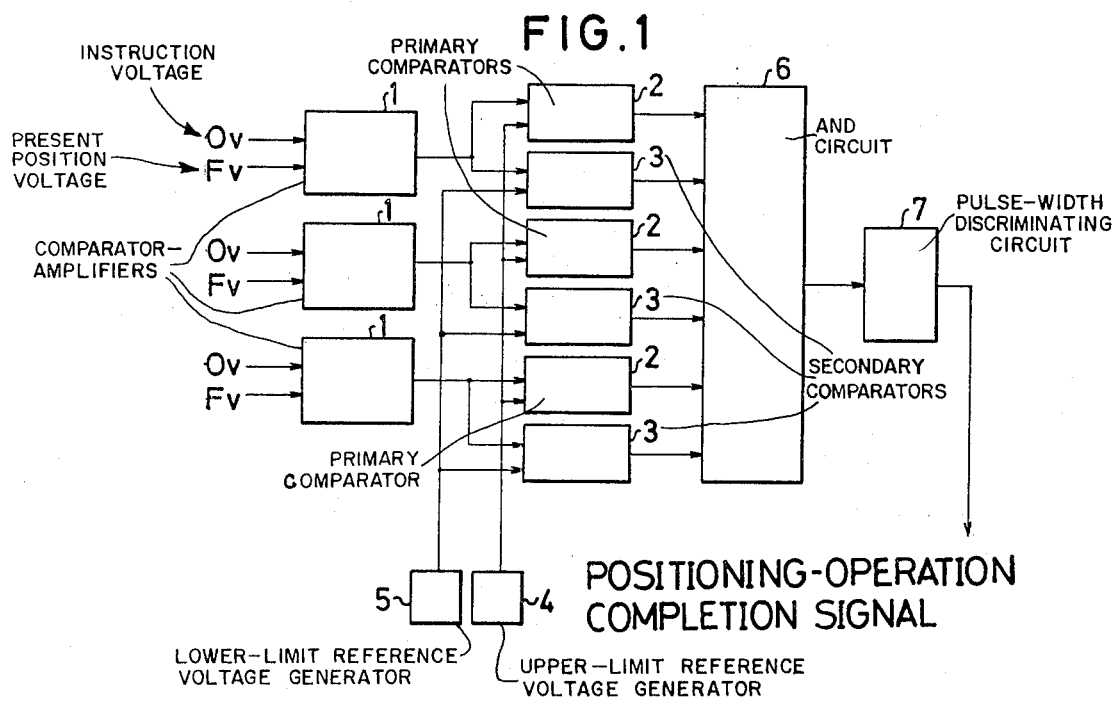
FIG. 1 is a block diagram explanatory of an embodiment of the invention for triaxial control.

Referring specifically to FIG. 1, the embodiment for triaxial control will be first explained. Instruction voltages Ov from a program control unit and voltages Fv fed back from detectors not shown which detect the present position are fed to the inputs of comparator-amplifiers 1 corresponding to the respective control axes. The outputs of the comparator-amplifiers 1 wherein error voltages of the control shafts obtained by comparison are amplified, are connected to primary comparators 2 and secondary comparators 3. Each of the primary comparators 2 produces a voltage "1" (4 to 6 V) when the absolute value of the error voltage is smaller than that of the reference voltage preset as an upper limit. Each of the secondary comparators 3 produces a voltage "1" (4 to 6 V) when the absolute value of the error voltage is smaller than that of the reference voltage preset as a lower limit. Also to the inputs of the primary comparators 2 are connected an upper-limit reference voltage generator 4 which produces a predetermined voltage for comparison with the error voltages. Likewise a lower-limit reference voltage generator 5 is connected to the inputs of the secondary comparators 3. The outputs of the primary comparators 2 and the secondary comparators 3 are connected to an AND circuit 6, which is so designed that when the groups of the comparators have compared the error voltages with the reference voltage and have all delivered outputs "1", the AND circuit 6 delivers an output "1", too. The output of the AND circuit 6 is connected to the input of a pulse-width discriminating circuit 7, from which a positioning-operation completion signal can be taken out. The pulse-width discriminating circuit 7 produces such a positioning-operation completion signal at the moment when the duration of the signal "1" transferred from the AND circuit 6 has exceeded a preset period of time.

In the case where a larger number of control axes are involved, a circuitry as illustrated in FIG. 2 is adopted in place of the one shown in FIG. 1 wherein the error voltage for each axis is compared with upper- and lower-limit reference voltages and the associated primary comparator 2 and secondary comparator 3 are caused to function. Of the error voltages delivered from the comparator-amplifiers in the same manner as in the first embodiment, the maximum positive voltage is detected by a maximum-value detecting circuit 8 and is output thereby. Similarly, the minimum of the error voltages is detected and output as such by a minimum-value detecting circuit 9. These detecting circuits 8, 9 are connected to primary and secondary comparators 2, 3, respectively. With this arrangement a device simplified by the sharp reduction in the number of comparators can achieve multiaxial control.

The operation of the positioning-operation conforming device according to the invention will now be explained. Instruction voltages Ov from a program control unit and voltages Fv fed back from detectors that detect the present position are compared and amplified by the comparator-amplifiers 1. The compared signals are supplied as error voltages to the primary comparators 2 and the secondary comparators 3. Then, the primary and secondary comparators 2, 3 feed signals "1" to the AND circuit 6 when the absolute values of the error voltages for the respective control axes are smaller than the absolute value of the upper-limit reference voltage (positive value) and when the values are smaller than that of the lower-limit reference voltage (negative value). When all of the input signals are "1", the AND circuit 6 also outputs "1". At the moment when the duration of the output "1" from the AND circuit 6 has exceeded a predetermined period of time, the pulse-width discriminating circuit 7 generates a positioning-operation completion signal, by which the program control unit is caused to proceed to the next step. The pulse-width discriminating circuit 7 may be omitted in the case when it is known in advance that the control system is free of any overshoot.

This invention is applicable not merely to industrial robots but, in addition, to numerical control units and program control units which involve positioning operation. It should also be appreciated that the invention is not limited to the embodiments above described but numerous alterations and modifications are possible without departing from the spirit of the invention.

As has been described in detail, the present invention provides a confirmation circuit which comprises a plurality of comparator-amplifiers which compare instruction signals with present-position detection signals and provide the results as error signals, a plurality of primary comparators or a single primary comparator which compare or compares the plurality of error signals from the comparator-amplifiers or one of such detected signals having the maximum value with an upper-limit reference signal, a plurality of secondary comparators or a single secondary comparator which compare or compares the plurality of error signals from the comparator-amplifiers or one of such detected signals having the minimum value with a lower-limit reference signal, an AND circuit which ANDs the output signals from the primary and secondary comparators, and a pulse-width discriminating circuit which sends out a positioning-operation completion signal at the moment when the duration of the certain signal obtained from the AND circuit has exceeded a predetermined time. Therefore, unless a positioning operation is actually performed, no ensuing instruction will be output, thus assuring reliable and safe positioning. To illustrate this in reference to FIG. 3, it is assumed that a program is planned for a robot arm so that, where there is an obstacle as hatched on its way from a point A to a point C, the arm bypasses the obstacle by moving to the point C by way of a point B. In this case, if a positioning operation is not confirmed the next instruction may be given before the arm reaches the point B. Should this occur, the arm would change its course to proceed in the direction as indicated by a broken line, with a serious danger of collision with the obstacle. In another case where it is programmed to have an object in the point B gripped, the subsequent instruction given may cause the arm to do a gripping operation before its arrival at that point. In accordance with this invention, the fact that the arm has arrived at the point B is detected by the built-in circuit and, on the basis of the result, the next instruction is provided. Therefore, the troubles as illustrated above can be completely avoided. A further advantage of the invention is that the provision of the pulse-width discriminating circuit precludes any erroneous operation due to overshooting.

What is claimed is:

1. A circuit for confirming positioning operation comprising a plurality of comparator-amplifiers which compare instruction signals with present-position detection signals and provide the results as error signals, maximum- and minimum-value detecting circuits which detect error signals with the maximum and minimum values of positive voltage from among the error signals output by the plurality of comparator-amplifiers, a primary comparator which compares the signal output from the maximum-value detecting circuit with an upper-limit reference signal, a secondary comparator which compares the signal output from the minimum-value detecting circuit with a lower-limit reference signal, an AND circuit which ANDs these output signals from the primary and secondary comparators, and a pulse-width discriminating circuit which sends out a positioning-operation completion signal at the moment when the duration of the certain signal obtained from the AND circuit has become equal to a predetermined period of time.

2. In a system for controlling the position of a member on the basis of command signals along a plurality of control axes and in which position signals are available along the plurality of control axes, a circuit for confirming the positioning operation, comprising: a plurality of first comparator means for comparing the command signals with the position signals along the respective control axes so as to produce error signals for each of the control axes, upper limit reference signal generator means for producing an upper limit reference signal, primary comparator means coupled to said upper limit reference signal generator means and said plurality of first comparator means for comparing error signals with the upper limit reference signal and for producing positive indication when the value of the error signals are less than the upper limit reference signal, lower limit reference signal generator means for producing a lower limit reference signal having a value less than the upper limit reference signal, secondary comparator means coupled to said lower limit reference signal generator means and said plurality of first comparator means for comparing the output of said plurality of first comparator means with the lower limit reference signal and for producing additional output indication when said error signals are less than the lower limit reference signal, said primary comparator and said secondary comparator means together having a plurality of outputs, said indications appearing at said outputs, AND circuit means coupled to the outputs of said primary comparator means and said secondary comparator means for producing a control signal as long as indications exist on all of the plurality of said outputs, and pulse width discriminator means coupled to the output of said AND circuit means for producing a position confirming signal when the control signal exceeds a predetermined time period and for producing a non-confirming signal when the control signals lasts less than the predetermined period.

3. A circuit as in claim 2, wherein said pulse width discriminating circuit produces an inhibit signal in conjunction with said non-confirming position signal so as to inhibit operation of the system until the position is confirmed.

4. A circuit as in claim 2, wherein said primary comparator means includes a plurality of primary comparators, each coupled to one of said first comparators and said upper limit reference signal generator means, said secondary comparator means including a plurality of secondary comparators each coupled to one of said first comparators and said lower limit reference generator means, each of said comparators comparing the input from said first comparator with the input from said reference signal generator means and forming one of the outputs.

5. A circuit as in claim 3, wherein said primary comparator means includes maximum value detecting circuit means connected to each of said first comparator means and a comparator for comparing the output of said maximum value detecting circuit means with the output of said upper limit reference signal generator means so as to compare the output of the maximum value detecting circuit means with the upper limit reference signal, said primary comparator having one of said outputs and producing the indication on said output, said secondary comparator means including a minimum value detecting circuit means coupled to each of said first comparator means for detecting the minimum value of said error signals, and a comparator coupled to said minimum value detecting circuit means and said lower limit reference signal generator means for comparing the lower limit reference generator signal with the minimum value, said secondary comparator having one of said outputs and producing indications as to one of said outputs, said AND circuit means producing the control signals when indications appear at the one output of said primary comparator and the one output of said secondary output.

* * * * *